United States Patent
Hernacki et al.

(10) Patent No.: US 7,529,187 B1
(45) Date of Patent: May 5, 2009

(54) DETECTING NETWORK EVASION AND MISINFORMATION

(75) Inventors: Brian Hernacki, San Carlos, CA (US); Jeremy Bennett, Mountain View, CA (US)

(73) Assignee: Symantec Corporation, Cupertino, CA (US)

( * ) Notice: Subject to any disclaimer, the term of this patent is extended or adjusted under 35 U.S.C. 154(b) by 834 days.

(21) Appl. No.: 10/839,737

(22) Filed: May 4, 2004

(51) Int. Cl.
*H04J 1/16* (2006.01)

(52) U.S. Cl. .......... 370/230; 726/11; 726/22; 726/23; 726/27; 726/28; 726/29; 726/30; 370/235; 370/237; 370/252; 709/225; 709/232

(58) Field of Classification Search .......... 726/1, 726/2, 3, 11, 12, 13, 14, 22, 23, 24, 25, 26, 726/27, 28, 29, 30, 31, 32, 33; 370/229, 370/230, 237, 242, 243, 244, 245, 246, 247, 370/248, 253; 709/225, 232; 714/14, 18, 714/748, 749, 799
See application file for complete search history.

(56) References Cited

U.S. PATENT DOCUMENTS

| | | | |
|---|---|---|---|
| 6,205,551 B1 * | 3/2001 | Grosse | 726/25 |
| 7,046,653 B2 * | 5/2006 | Nigrin et al. | 370/343 |
| 7,114,181 B2 * | 9/2006 | Ramaiah et al. | 726/22 |
| 7,171,683 B2 | 1/2007 | Pazi et al. | |
| 2003/0084319 A1 | 5/2003 | Tarquini et al. | |
| 2003/0112780 A1 * | 6/2003 | Ouyang et al. | 370/338 |
| 2003/0172289 A1 | 9/2003 | Soppera | |
| 2006/0045068 A1 * | 3/2006 | Wu et al. | 370/352 |
| 2006/0168321 A1 * | 7/2006 | Eisenberg et al. | 709/238 |

OTHER PUBLICATIONS

U.S. Appl. No. 10/839,736, Hernacki et al.
Thomas Ptacek, "Insertion, Evasion, and Denail of Service: Eluding Network Intrusion Detection", 1998, Secure Networks, Inc., pp. 1-67.

* cited by examiner

*Primary Examiner*—Aung S Moe
*Assistant Examiner*—Abdullah Riyami
(74) *Attorney, Agent, or Firm*—Van Pelt, Yi & James LLP (57) ABSTRACT

Network evasion and misinformation detection are disclosed. Techniques are provided for network security, including determining whether a particular packet, segment, frame, or other data encapsulation has been retransmitted. By detecting and tracking retransmits, the packet may be compared to the original packet to determine whether an attack exists. By evaluating the original data stream and a copy of the original data stream modified with the retransmitted packet, an evasion or misinformation attempt may be detected, invoking pattern or signature matching to determine whether an attack is attempted against a target host.

14 Claims, 6 Drawing Sheets

DETECTING NETWORK EVASION AND MISINFORMATION

CROSS REFERENCE TO RELATED APPLICATIONS

This application is related to co-pending U.S. patent application Ser. No. 10/839,736 entitled "Evasion Detection" filed concurrently herewith, which is incorporated herein by reference for all purposes.

FIELD OF THE INVENTION

The present invention relates generally to network security. More specifically, detecting network evasion and misinformation is disclosed.

BACKGROUND OF THE INVENTION

Network security applications and systems include techniques for attempting to detect, halt, or prevent attacks against network assets (e.g., computers, servers, databases, etc.). While many typical intrusion detection systems (IDS) and intrusion prevent systems (IPS) attempt to observe data traffic as viewed at a monitoring point remote from a host that may be the target of an attack, such as at a firewall, the data traffic actually received by the target host may be different than the traffic as viewed at the monitoring point. Due to the different perspectives or host contexts between an IDS and a host, an attacker may be able to send one or more diversionary packets that enable a data flow or data stream to carry an attack to a victim host, without alerting an IDS, or conversely to deceive an IDS into believing that a particular attack is being attempted when in fact it is not. Attack signatures and known threat patterns can be obfuscated using evasive data flow techniques.

Protocols such as TCP/IP and others can be exploited by attackers by altering the method in which data traffic is sent between a source and a host or by modifying the actual data stream and individual packets. Protocol exploitation may be used to add, replace, or retransmit packets to a particular data stream to confuse an IDS or mask and obfuscate an attack. By modifying a data flow or stream, for example, by adding or substituting packets that would prevent an IDS from pattern matching or recognizing an attack, an attacker can evade detection and perform a successful attack, hack, or compromise of an asset. Further, data communication protocols provide a specific standardized set of algorithms for handling data traffic and, in so doing, provide the ability for an attacker to recognize and exploit a weakness in the protocol, particularly for destination hosts reassembling transmitted or retransmitted data packets, frames, segments, etc.

Thus, what is needed is a solution for detecting a network evasion or misinformation. Further, a solution for detecting evasive attacks exploiting data communication protocols is also desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Attackers can send a data stream that might contain packets intended to reach a particular point in a network, but not the victim host (destination), relying upon data communication protocols (e.g., TCP, IP, etc.) to provide predictable handling of received data packets. Subsequently, an attacker can exploit the difference in a detection point of view or host context, in order to deliver an attack over a protocol (e.g., IPv4, IPv6, etc.). An attacker can deliver an attack, evading an IDS or other network security application, by sending data that forces a retransmit. An evasive data flow or stream may contain, for example, a packet containing a false payload or one that is modified in such a way as to cause the packet to be dropped in transit or rejected by the target host. Such packets may be constructed by adjusting packet header information such as time-to-live (TTL) values or one having malformed IP options, which can cause the packet to be dropped in transit (i.e., TTL expires prior to reaching the target host), rejected (i.e., by the target host, due to malformed IP options, e.g.), or another event that causes the packet to be retransmitted. A typical IDS is configured to ignore such retransmitted packets if the original packet was received and processed successfully by the IDS. Likewise, an IDS may be configured so as to accept a packet that the target host would reject, e.g., due to malformed IP options. This creates an opportunity to cause an IDS to see and process a different packet (the original packet)

than the one actually received and processed by the target host (the retransmitted packet). For example, an attacker may send an original packet configured to be received and processed by the IDS but not the target host (e.g., by adjusting the TTL, including malformed IP options, or other techniques). This creates the need and opportunity to retransmit the packet to the target host (e.g., in response to a retransmit request from the target host or due to the expiration of a prescribed time period without an acknowledgement being received, depending on the protocol). Instead of retransmitting the same packet, the attacker generates and sends an attack packet having the same sequence (or other identifying) number of the packet to be retransmitted, that attack packet including an attack or other threat. Since the IDS has already received and processed that original packet having the sequence number born by the attack packet, the attack packet evades detection by the IDS. The same technique can be used to generate on the IDS a false indication that an attack has been detected by including the attack content in the original packet processed by the IDS and sending an innocuous "retransmitted" packet to the target host. As described herein, network security system/process evasion or misinformation is detected by checking packets that are retransmits of a packet previously received and processed by the IDS to determine if the retransmitted packet is the same as the corresponding original packet, and performing further processing if the retransmitted packet is not the same as the original.

Retransmissions occur when a packets are malformed in a way that prevents their being processed fully or properly at their destination, when packets are not received at their destination, or under other conditions that may require a sender to resend the packet. This could occur as the target host, when reassembling a data stream discovers a missing packet and requests retransmission of the missing packet from the sender. This may also occur when a defective packet is discarded, forcing the target host to request the sender to retransmit the packet. Under some protocols (e.g., TCP), a retransmit is not specifically requested and retransmits are instead triggered by the non-receipt of an acknowledgement (ACK) packet within a prescribed time period.

As noted above, an attacker can exploit these aspects of the governing network communication protocols to send attack packets that reach a target host without being detected by an IDS (evasion), or reach the IDS while an innocuous "retransmitted" packet is received at the target host (misinformation). These packets may be added to a data stream to confuse the IDS and prevent it from, among other activities, matching an attack signature or pattern and either blocking or preventing the attack data flow from reaching the victim host. In one example, using protocols such as TCP, packets may be retransmitted in sequential order. An attack may be sent to a victim host as retransmitted packets. The retransmitted packets are ignored by the IDS, which believes them to be duplicative of earlier-received packets, and are able to reach the target host, which never received (or ignored, e.g., in the case of an IP options-based evasion) the corresponding packets received earlier by the IDS. Examples of such evasion and misinformation techniques, as well as techniques for detecting same, are described below.

Figure 1:
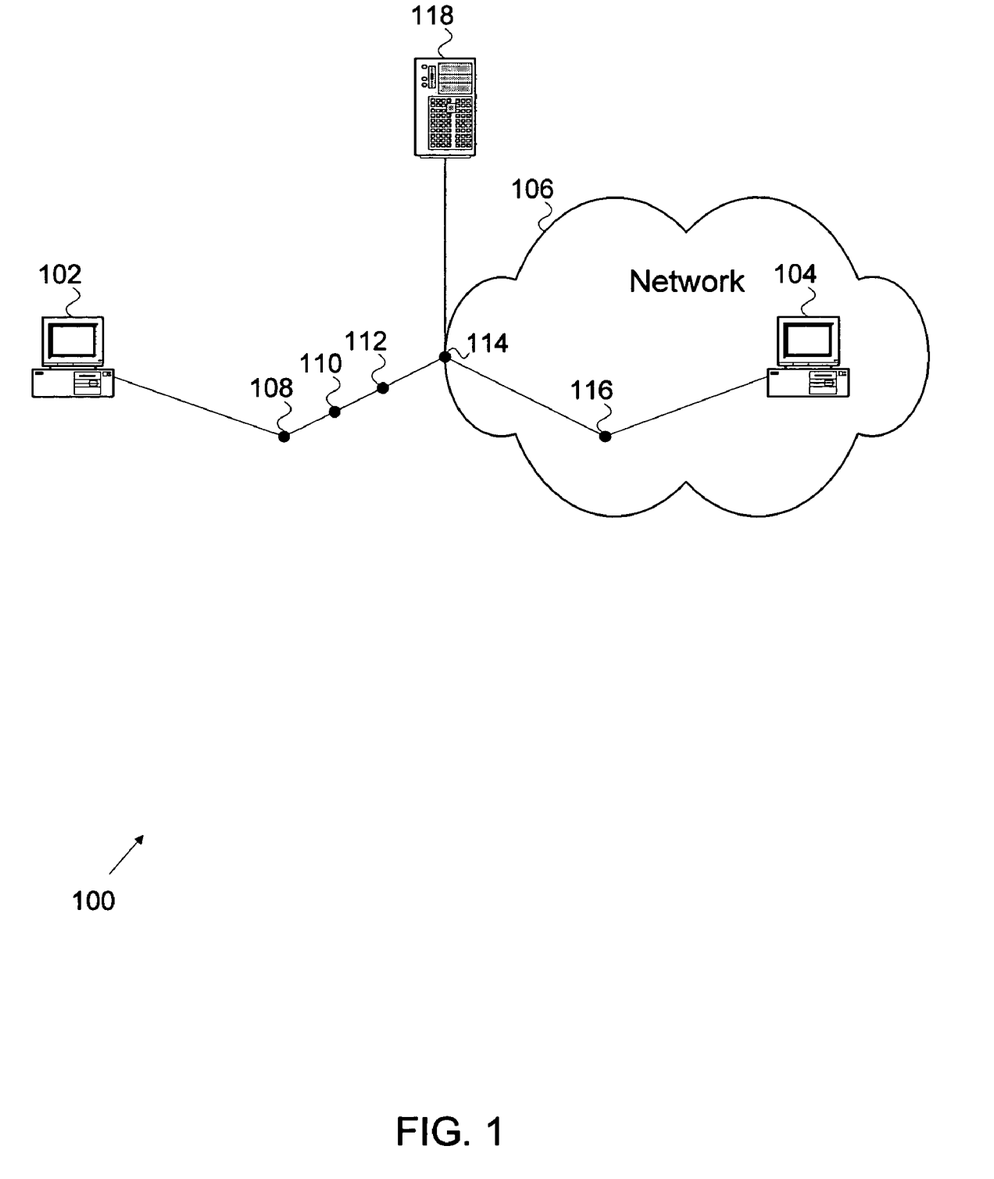
FIG. 1 illustrates an evasion detection system in accordance with an embodiment.

FIG. 1 illustrates an evasion detection system in accordance with an embodiment. System 100 includes an attacker 102 sending an attack to host 104 on network 106. Routed through intervening external network nodes 108-112, firewall 114, and internal network node 116, data sent from attacker 102 are transmitted with the intent to evade evasion detection system (EDS) 118. EDS 118 may be implemented as part of a network intrusion detection system (NIDS), firewall, proxy server, or other security application. EDS 118 may also be implemented as a standalone device, application, or utility as well.

Each of the hops between nodes 108-116 represents a router, server, or other routing device along the path length between attacker 102 and host 104. Fewer or more hops may be included, depending upon network routing conditions (e.g., casualties, packet loss, latency, etc.) and configurations. The hops between nodes 108-112 represent intermediate distances along an internetwork such as the Internet. Alternatively, hops between nodes 108-112 may also be within a larger WAN or other similar network. Node 114 is intended to be an egress/ingress node to/from network 106 and node 116 is internal to network 106. Node 114 may be implemented as an edge router or other device acting as a gateway to network 106.

Packets, as used in the Internet Protocol (IP) for example, may be transmitted across each hop, with each node being configured to decrement a time-to-live (TTL) value. As used herein, packets, segments, fragments, frames, or other forms for encapsulating data are referred to as "packets." TTL represents the number of hops that a packet may traverse before being discarded. Each packet sent between a source (SRC) and a destination (DST) node, host, terminal, server, etc. includes a TTL value that ensures that packets that for whatever reason are not able to reach their destination within a prescribed number of network hops do not persist in and potential degrade the performance of the network.

Figure 2:
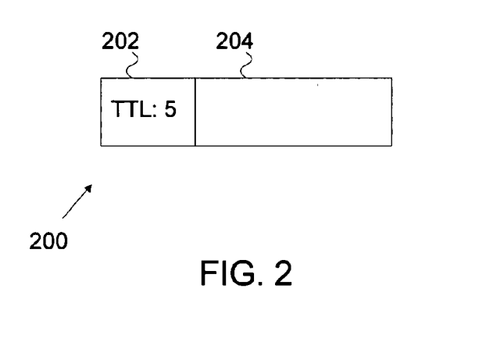
FIG. 2 illustrates a data packet, in accordance with an embodiment.

FIG. 2 illustrates a data packet 200 including a TTL value, in accordance with an embodiment. Included within the packet header 202 is a TTL value, in this example, "5." The packet body 204 may include a payload, IP options, additional header values, or other data.

In an attack, an attacker 102 can attempt to misguide or evade an EDS 118 by sending additional packets to be viewed by EDS 118, which are configured such that they will not be received or will be ignored at target host 104 (in the example shown in FIG. 1). By manipulating a value in packet header 200, an attacker can obfuscate the pattern or signature of an attack by inserting additional packets into the data flow. The additional packets may be intended to mask an incoming attack from detection, or to cause the EDS and/or another security system to falsely conclude that an attack has taken or is taking place. However, EDS 118 can detect such an evasion or misinformation attempt by processing "retransmitted" packets, as described in connection with FIGS. 7 and 8 below.

Figure 3:
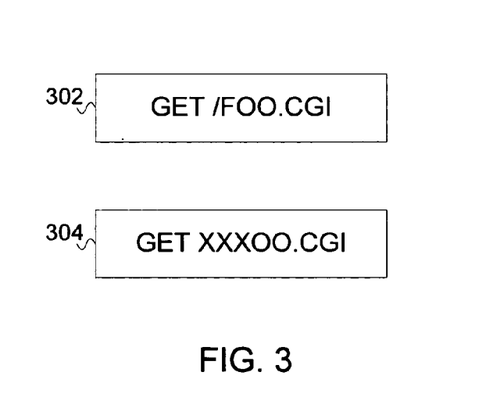
FIG. 3 illustrates a comparison between valid data and evasion data, in accordance with an embodiment.

FIG. 3 illustrates a comparison between data as received by an NIDS and data as received by a target host, in accordance with an embodiment. In this example, a first data stream may be sent with a message "GET /FOO.CGI," as shown by valid stream 302. The stream 302 is "valid" in the sense that it is supposed in this example that it does not correspond to any attack or known attack signature. However, an attacker may attempt to disguise an attack in order to avoid detection by a NIDS (or other security device or application), such as by sending the valid stream 302 in such a way that the NIDS will believe that only innocuous traffic is being sent to the target host when in fact the data stream as seen by the target host includes the attack stream 304. For example, as described above, the attacker could cause the valid stream 302 to be seen by the NIDS and not by the target host by setting the TTL to expire just before the packet would reach the target but after the NIDS had received it, or by including malformed IP options that the NIDS would ignore. Attack data stream 304 includes, in this example, attack "GET XXXOO.CGI," which in this example it is supposed matches an attack signature. The attack data stream 304 is similar to that of valid data stream 302, except that instead of "/F," "XXX" has been substituted. By causing the NIDS to believe that the valid data stream 302 has been received by the target host, when in fact the attack data stream 304 was received by the target host, attacker 102 may be able to avoid detection, thus enabling an attack to evade detection by the NIDS.

Figure 4:
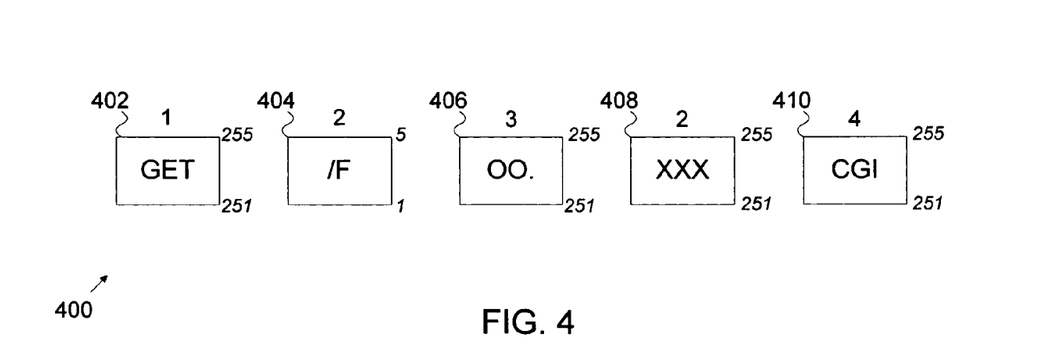
FIG. 4 illustrates a data flow using an evasion technique, in accordance with an embodiment.

FIG. 4 illustrates a data flow using an evasion technique, in accordance with an embodiment. Attack data flow 400 has been broken into several packets 402-410. Attack data flow 400 may also be referred to as an evasion data stream. Using IP as a data transmission protocol, e.g., packets 402-410 are transmitted and reassembled in proper order, regardless of the order in which the packets are received at host 104. However, if a packet is lost (i.e., times out or TTL expires) or discarded (e.g., by the target host), the lost or discarded packets must be retransmitted. An attacker can take advantage of the retransmission mechanisms of a protocol such as IP and, because a NIDS may have already seen the original packet, the retransmitted packet may be ignored at the NIDS.

As shown in this example, packets 402-406 are transmitted from a source to a destination. The number shown above each of the packets (e.g., "1", "2", "3", etc.) represents a sequence number indicating the order in which the packets are to be reassembled, regardless of the order of transmission. As an example, a packet may be discarded (not forwarded) because an assigned TTL value decrements to 0 prior to reaching the target host. The number near the upper right corner of each packet 402-410 represents the original TTL value included by the source node, and the number near the bottom right corner indicates the TTL value at the time the packet has reached the NIDS (i.e., after having been decremented by the intervening network nodes that forwarded the packet on to the node at which the NIDS is configured to monitor network traffic flows to/from the target host). In this example, four intervening nodes have processed each packet, as indicated by the fact that in each case the TTL value has been decremented to be four less than the original value set by the source node. However, in this example, assume that packets sent to the target host must traverse at least one internal network node, downstream from the point at which the NIDS is configured to monitor network flows associated with the target host (see, e.g., FIG. 1). Assuming that were the case, the packet 404 (bearing sequence number "2") would never have reached the target host, because the intervening node would have, upon receiving that packet, decremented the TTL to zero and as a result would have dropped the packet instead of forwarding it on to the target host. Thus a replacement packet may be requested (either explicitly or implicitly, e.g., due to lack of acknowledgement, depending on the protocol) for retransmission.

When the attacker subsequently "retransmits" the packet number "2", instead of sending a duplicate of the original packet (404), the attacker instead sends packet 408 including an attack or portion thereof (i.e., "XXX") designating the packet as sequence number "2". The NIDS typically will be configured to ignore the packet 408, e.g., because it believes the packet to be an unnecessary retransmission of a packet that has already been received successfully in the form of packet 404 and, presumably, already scanned for an attack. Using this evasion technique, an attacker can cause a NIDS or other security device or application to believe that the target host has received an innocuous data stream, such as the valid data stream 302 of FIG. 3, when in fact the data stream as seen by the target host includes an attack, such as the hypothetical attack data stream 304 of FIG. 3 (i.e. evasion). The same technique may be used, of course, to cause the NIDS to believe that an attack stream has been received by the target host when in fact it has not, e.g., to cause the NIDS and/or security personnel to become occupied processing a false alarm while other attacks are perpetrated (i.e., disinformation). However, by evaluating the retransmitted packet, assembled given the host context of the original data streams as described below, a determination may be made as to whether an evasion or disinformation technique of the type described above has been or is being employed.

Figure 5:
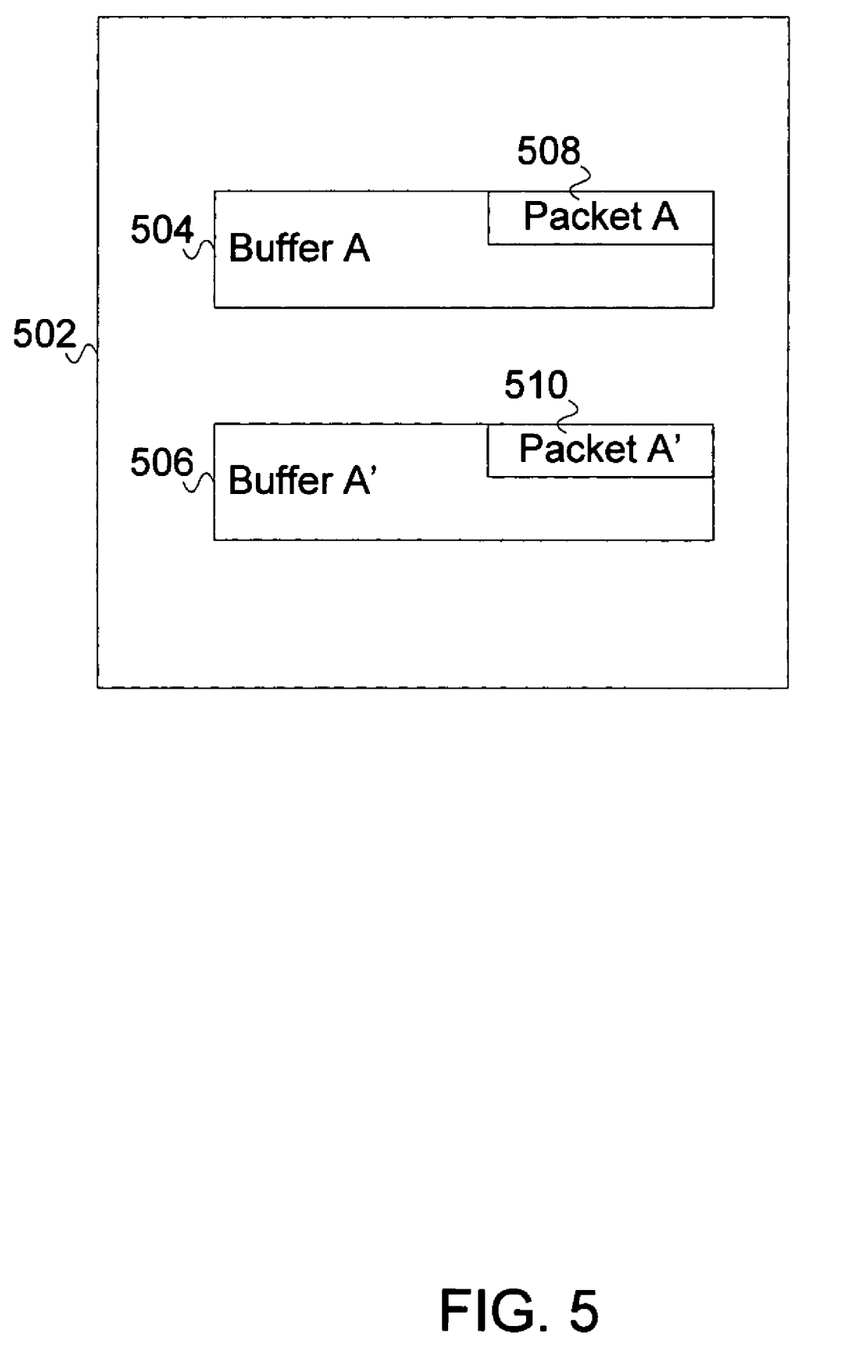
FIG. 5 illustrates a data structure for detecting network evasion and misinformation, in accordance with an embodiment.

FIG. 5 illustrates a data structure for detecting network evasion and misinformation, in accordance with an embodiment. In this example, data structure 502 (e.g., file, table, object, etc.) may be used for buffering data related to a data stream where a packet is lost or discarded and replaced with a retransmitted packet. Included within data structure 502 are Buffer A 504 and Buffer A' 506. Buffer A 504 includes an original data stream, which may be a network traffic flow directed to a target host. In this example, Buffer A 504 and Buffer A' 506 are created when NIDS 118 (FIG. 1) detects that a packet associated with a data stream to a target host has been retransmitted. Included within Buffer A 504 is packet A 508, the initial packet sent with the original data stream. Buffer A' 506 includes packet A' 510, which is a retransmitted packet that may include an attack against a target host.

In this example, when a retransmission or retransmitted packet is detected, data structure 502 is created with a split buffer to store a first copy of the original data stream (504) and a second copy of the original data stream including the retransmitted packet (506). As described below, the copies or buffers are compared during processing to detect whether a threat, attack, or intrusion signature may be present. Threat or attack identification is described in further detail below in connection with FIGS. 6-8.

Figure 6:
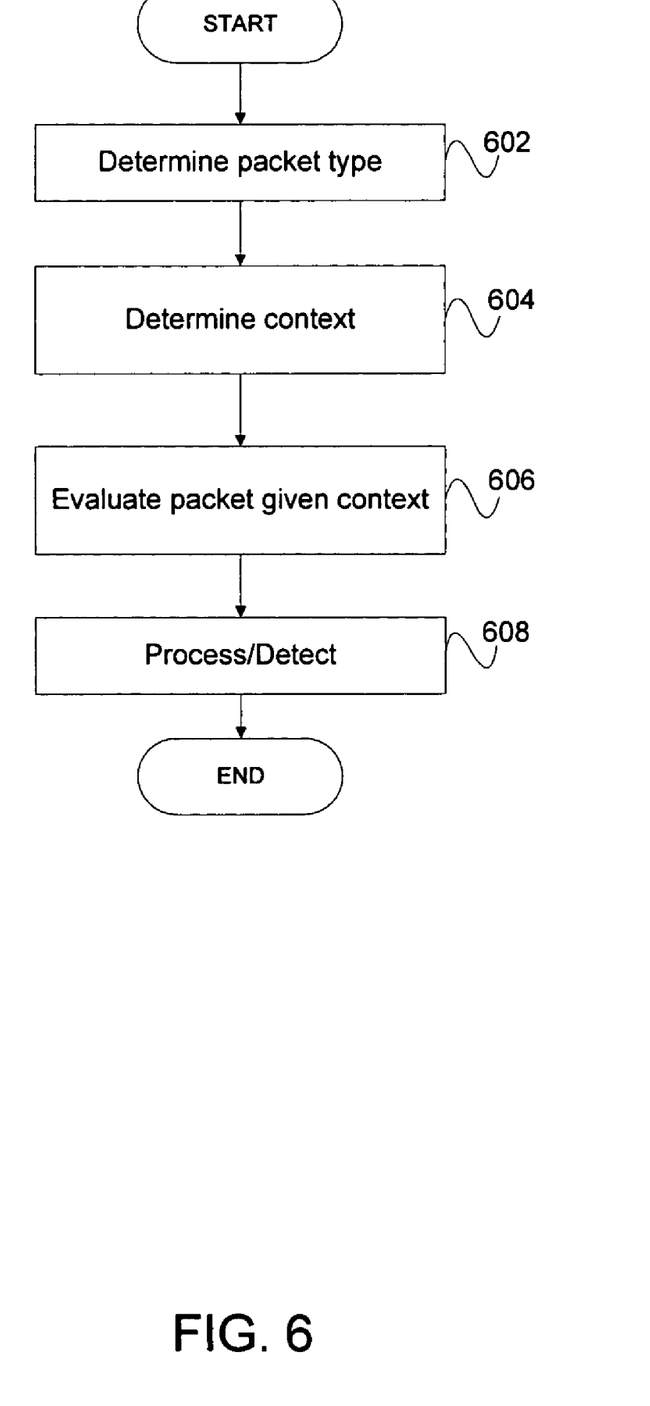
FIG. 6 illustrates a process for detecting network evasion and misinformation, in accordance with an embodiment.

FIG. 6 illustrates a process for detecting an attack, in accordance with an embodiment. Upon receipt, a packet type is determined (602). Examples of types of packets may include those for specific protocols such as UDP, TCP, IP, or other encapsulation formats required at various network layers. Once the type has been determined, a context is then determined for the packet (604). A context may include the data stream associated with the particular packet. The context may also include other information related to the packet such as state, a unique identifier, etc.

In this example, after the context has been determined, the packet may be evaluated given a particular context (606). Evaluating the packet may include inserting the packet into the appropriate place in a data stream with which the context is associated. Processing is performed on the data stream to determine or detect whether an attack or threat exists (608). Processing invoked by an IDS or IPS may include pattern or signature matching, alert generation, blocking or other measures taken to defeat a detected threat, attack, or intrusion. Other security measures or countermeasures may also be included in IDS processing invoked to determine whether an attack, threat, or intrusion exists and is not limited to pattern or signature matching.

Figure 7:
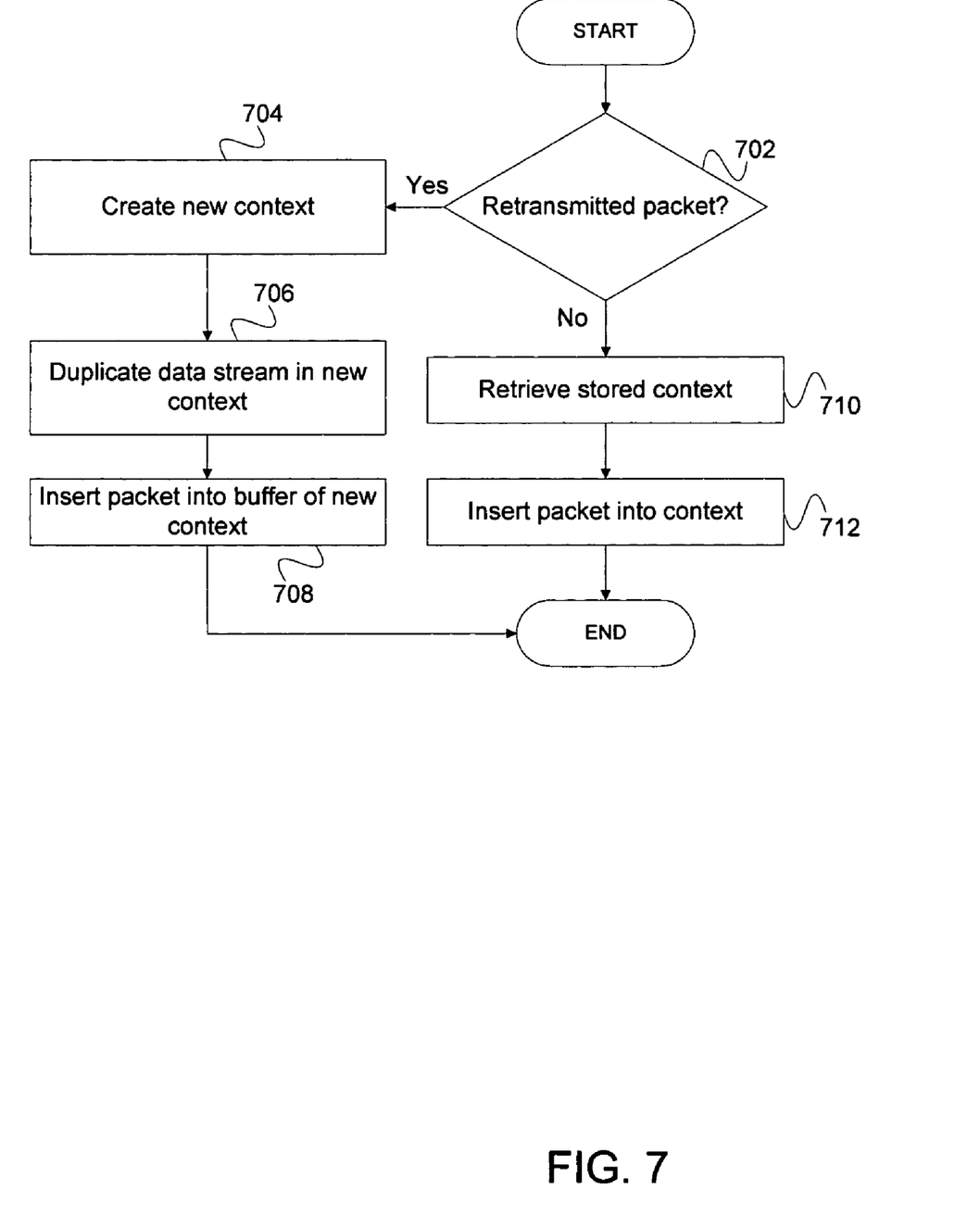
FIG. 7 illustrates a process for determining a context, in accordance with an embodiment.
Figure 8:
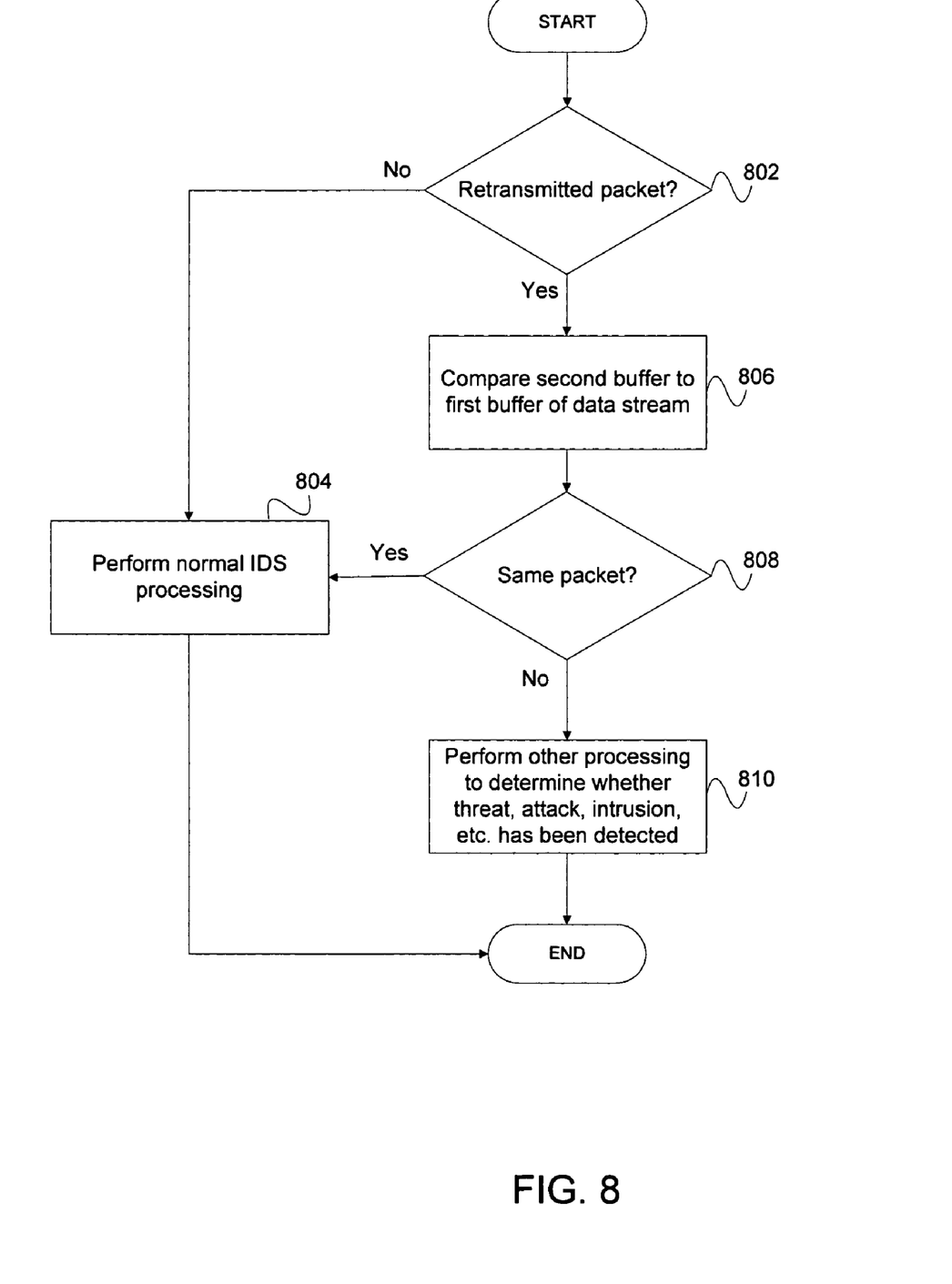
FIG. 8 illustrates a process for evaluating a packet given a context, in accordance with an embodiment.

FIGS. 7 and 8 illustrate techniques for processing retransmitted packets to identify and defeat evasion and misinformation techniques. In one embodiment, steps 604-608 of the process shown in FIG. 6 include the processes shown in FIGS. 7 and 8.

FIG. 7 illustrates a process for creating a split buffer to allow for further processing of retransmitted packets, in accordance with an embodiment. It is determined whether a received packet is a retransmitted packet (702). As an example, NIDS 118 (FIG. 1) may determine whether the packet is a retransmitted packet by evaluating information included in the packet header, such as the packet sequence number. If the packet is a retransmission, then a new context is created (704). Creating a new context includes duplicating the data stream with which the retransmitted packet is associated and storing the original and duplicate copies in separate buffers assigned to the new context (706), e.g., as shown in FIG. 5. The retransmitted packet is inserted into the duplicate buffer (i.e., the new context) in place of the corresponding originally received packet in preparation for evaluating the packet to determine whether an attack exists (708). For example, referring to FIG. 4, if in the original context for a flow packets 402, 404, 406, and 410 had been re-assembled to arrive at the data stream 302 of FIG. 3, the new context would include packets 402, 408, 406, and 410, in that order, to arrive at the data stream 304 of FIG. 3.

In this example, a packet that is not a retransmission is treated differently. The stored context (e.g., previously stored or created context) is retrieved from memory (710). The packet is inserted or assembled into the context in proper sequence in order to reassemble the data stream (712). In so doing, the NIDS, IPS, IDS, etc. is able to resolve the transmitted data stream and maintain a copy for future use, in the event a retransmission occurs, in addition to processing the data stream to determine if any attack-related data is presented, e.g., by searching for one or more attack signatures in the data stream (e.g., step 608 of FIG. 6).

In some alternative embodiments, step 710 precedes step 702 and the original stored context with which a packet is received is retrieved before it is determined whether the packet appears to be a retransmitted packet. In some such embodiments, data associated with the stored context is used in step 702 to determine whether a received packet appears to be a retransmit of a previously-received and processed packet. If the packet is determined to be a retransmit, the process proceeds to step 704 and a new context and duplicate data stream are created. If the packet is determined not to be a retransmit, the packet is inserted into the context in step 712, as described above.

FIG. 8 illustrates a process for evaluating a packet in an appropriate context, in accordance with an embodiment. Here, this process may be used to evaluate a packet to determine whether an attack, threat, or intrusion exists. After determining the context for the received packet, treatment is determined based on whether the packet is a retransmission or not (802). In some embodiments, the process of FIG. 7 is used in connection with the process of FIG. 8, and in such embodiments it is not necessary to make a separate determination in step 802 whether the packet is a retransmitted packet, because that determination has already been made in step 702 of FIG. 7. If the packet is not a retransmitted packet, then normal IDS processing is performed (804). In embodiments in which the process of FIG. 8 is used in connection with the process of FIG. 7, step 804 is performed after step 712 for packets that are not retransmitted packets. However, if the packet is a retransmission, then the packet is evaluated differently.

As an example, the process illustrated in FIG. 7 provides a context for the retransmitted packet. This includes duplicate stored or buffered copies of the data stream associated with the retransmitted packet. One copy includes the original data stream, including the initial packet that the retransmission is sent to replace. The second copy includes the original data stream, but has been modified to include the retransmission. Both copies are retrieved and compared against each other (806). A determination is made as to whether the retransmitted packet and the original packet are the same (808). Depending on the applicable protocols, step 808 may comprise determining if the later received (retransmit) packet is bit for bit an exact duplicate of the corresponding original packet, or may instead require that certain differences in the packets be ignored, e.g., so that packets identical in all respects except for a timestamp will not be flagged as possibly indicating an evasion or misinformation attempt. If the comparison yields the result that the retransmitted packet is the same as the originally transmitted packet, then normal IDS processing is performed (804). However, if the retransmitted packet is not the same, then a threat, attack, intrusion, evasion by malformed option, or other discrepancy may be present.

Both buffers are scanned to determine whether an attack exists (810). If the original data stream (i.e., the copy with the originally-sent packet) triggers an alert (e.g., signature or pattern match to a known threat) but the second data stream is innocuous, then a misinformation attempt has been made to deceive NIDS 118 or other gateway security device. However, if the second data stream (i.e., second buffer or duplicate including the retransmitted packet) includes an attack but the first does not, then an evasion attempt has been made to slip an attack past NIDS 118 to target host 104 (FIG. 1). Upon detection, other processing may be invoked to address the retransmitted packet. The other processing may include signature or pattern matching, generating an alert, blocking, hardening, or other techniques intended to prevent or stop an attack against a target host. The detection of the difference between the original packet and the retransmission packet may be indicative that an evasion or misinformation attempt has been made given the different perspectives of a NIDS, IPS, IDS, etc. and a target host.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for providing network security, comprising:
receiving a packet at a device;
determining whether the packet appears to be a retransmission of a previously-received packet;
if it is determined that the packet appears to be a retransmission of a previously-received packet, comparing the packet to the previously-received packet to determine whether a detection criterion has been satisfied; and
generating an action if the detection criterion has been satisfied;
wherein generating an action comprises:
duplicating an original data stream associated with the previously-received packet to create a duplicate data stream;
inserting the packet into the duplicate data stream in place of the previously-received packet; and
processing the original data stream and the duplicate data stream to determine whether the packet is associated with an attempt to evade or mislead a network security process.

2. A method as recited in claim 1 further including determining a context of the packet.

3. A method as recited in claim 1 further including creating a new context for the packet if it is determined that the packet appears to be a retransmission of a previously-received packet.

4. A method as recited in claim 1 wherein processing the original data stream and the duplicate data stream comprises determining whether either data stream comprises data associated with an attack.

5. A method as recited in claim 1 wherein processing the original data stream and the duplicate data stream comprises determining whether either data stream comprises data that matches an attack signature.

6. A method as recited in claim 1 wherein processing the original data stream and the duplicate data stream comprises:
   determining whether either data stream comprises data associated with an attack; and
   in the event it is determined that the original data stream comprises data associated with an attack but the duplicate data stream does not, concluding that the packet may be associated with an attempt to generate a false indication that a target host to which the packet is addressed is being or has been attacked.

7. A method as recited in claim 1 wherein processing the original data stream and the duplicate data stream comprises:
   determining whether either data stream comprises data associated with an attack; and
   in the event it is determined that the duplicate data stream comprises data associated with an attack but the original data stream does not, concluding that the packet may be associated with an attempt to evade detection of an attack on a target host to which the packet is addressed.

8. A method as recited in claim 1 further comprising generating an alert if it is determined that the packet is associated with an attempt to evade or mislead a network security process.

9. A method as recited in claim 1 wherein the network security process comprises an intrusion detection process.

10. A method as recited in claim 9 wherein the intrusion detection process comprises a process running on an intrusion detection system connected at an observation node and configured to monitor packets being sent to a target host located at a network node other than the observation node.

11. A system for providing network security, comprising:
   a network connection configured to receive a packet;
   a processor configured to:
      determine whether the packet appears to be a retransmission of a previously-received packet;
      if it is determined that the packet appears to be a retransmission of a previously-received packet, compare the packet to the previously-received packet to determine whether a detection criterion has been satisfied; and
      generate an action if the detection criterion has been satisfied; and
   a memory configured to store the packet;
   wherein the action comprises:
      duplicating an original data stream associated with the previously-received packet to create a duplicate data stream;
      inserting the packet into the duplicate data stream in place of the previously-received packet; and
      processing the original data stream and the duplicate data stream to determine whether the packet is associated with an attempt to evade or mislead a network security process.

12. A system as recited in claim 11 wherein processing the original data stream and the duplicate data stream comprises determining whether either data stream comprises data associated with an attack.

13. A computer-readable storage medium having computer instructions which when executed cause the computer to perform a method, the method comprising the steps of:
   receiving a packet;
   determining whether the packet appears to be a retransmission of a previously-received packet;
   if it is determined that the packet appears to be a retransmission of a previously-received packet, comparing the packet to the previously-received packet to determine whether a detection criterion has been satisfied; and
   generating an action if the detection criterion has been satisfied
   wherein generating an action comprises:
      duplicating an original data stream associated with the previously-received packet to create a duplicate data stream;
      inserting the packet into the duplicate data stream in place of the previously-received packet; and
      processing the original data stream and the duplicate data stream to determine whether the packet is associated with an attempt to evade or mislead a network security process.

14. A computer-readable storage medium product as recited in claim 13 wherein processing the original data stream and the duplicate data stream comprises determining whether either data stream comprises data associated with an attack.

* * * * *